United States Patent
Hoernicke et al.

(10) Patent No.: US 12,216,456 B2
(45) Date of Patent: *Feb. 4, 2025

(54) CONFIGURATION OF A MODULAR PLANT

(71) Applicant: ABB Schweiz AG, Baden (CH)

(72) Inventors: Mario Hoernicke, Landau (DE); Ralf Jeske, Petershagen (DE); Joerg Schubert, Lehrte (DE)

(73) Assignee: ABB Schweiz AG, Baden (CH)

( * ) Notice: Subject to any disclaimer, the term of this patent is extended or adjusted under 35 U.S.C. 154(b) by 89 days.

This patent is subject to a terminal disclaimer.

(21) Appl. No.: 18/316,438

(22) Filed: May 12, 2023

(65) Prior Publication Data

US 2023/0280725 A1 Sep. 7, 2023

Related U.S. Application Data

(63) Continuation of application No. 17/369,993, filed on Jul. 8, 2021, now Pat. No. 11,687,062.

(30) Foreign Application Priority Data

Jul. 9, 2020 (EP) .................................... 20185014

(51) Int. Cl.
G06F 9/44 (2018.01)
G05B 19/418 (2006.01)
G06F 9/445 (2018.01)

(52) U.S. Cl.
CPC ... *G05B 19/41845* (2013.01); *G06F 9/44542* (2013.01); *G05B 2219/35029* (2013.01)

(58) Field of Classification Search
CPC ....................................................... G06F 9/44
See application file for complete search history.

(56) References Cited

U.S. PATENT DOCUMENTS 6,493,594 B1 * 12/2002 Kraml ...................... G06F 8/64
700/86
2004/0196039 A1 * 10/2004 Haworth ................ G01R 33/28
324/318

(Continued)

FOREIGN PATENT DOCUMENTS

CN 101470621 A 7/2009
CN 102063332 A 5/2011

(Continued)

OTHER PUBLICATIONS

Zhao et al., "Design and Implementation of Measure and Control Software Development Platform Based on Component-Based Idea," *Electronic Design Engineering*, 21(8): 18 pp. (Dec. 31, 2013).

(Continued)

*Primary Examiner* — Jae U Jeon
(74) *Attorney, Agent, or Firm* — Leydig, Voit & Mayer, Ltd.

(57) ABSTRACT

A method of providing a control software configuration for a module of a modular plant, the method including, in a module engineering phase: receiving a user definition for the module; and automatically generating the control software configuration for the module based on the user definition, the automatically generating including: specifying parameters for the module that are not specific to any target system; and providing the control software configuration as a controller-agnostic configuration file for subsequent binding of controller software instantiated according to the controller-agnostic configuration file to a hardware controller of the module when the module is integrated into a target system during a plant engineering phase.

14 Claims, 11 Drawing Sheets

(56) References Cited

U.S. PATENT DOCUMENTS

| | | | |
|---|---|---|---|
| 2005/0216902 A1 | 9/2005 | Schaefer | |
| 2008/0301674 A1 | 12/2008 | Faus | |
| 2011/0191686 A1* | 8/2011 | Wolff-Petersen | G06F 13/102 715/735 |
| 2016/0132037 A1 | 5/2016 | Weng et al. | |
| 2019/0286098 A1* | 9/2019 | Weng | G05B 19/409 |

FOREIGN PATENT DOCUMENTS

| | | |
|---|---|---|
| CN | 103226489 A | 7/2013 |
| CN | 108562849 A | 9/2018 |

OTHER PUBLICATIONS

The Patent Office of the People's Republic of China, Office Action in Chinese Patent Application No. 202110772337.4, 13 pp. (Mar. 27, 2024).

Abb, "Understanding modular automation," White Paper, 12 pp. (Jun. 13, 2018).

Bernshausen et al., "Namur Modul Type Package—Definition," atp magazin, 58(1-2): 72-81 (Jan. 2016).

Hoernicke et al., "Modular Process Plants: Part 2—Plant Orchestration and Pilot Application," ABB Review, 30-35 (Aug. 2019).

Huffman, "Benefits of State Based Control," White Paper, 32 pp. (Feb. 16, 2009).

\* cited by examiner

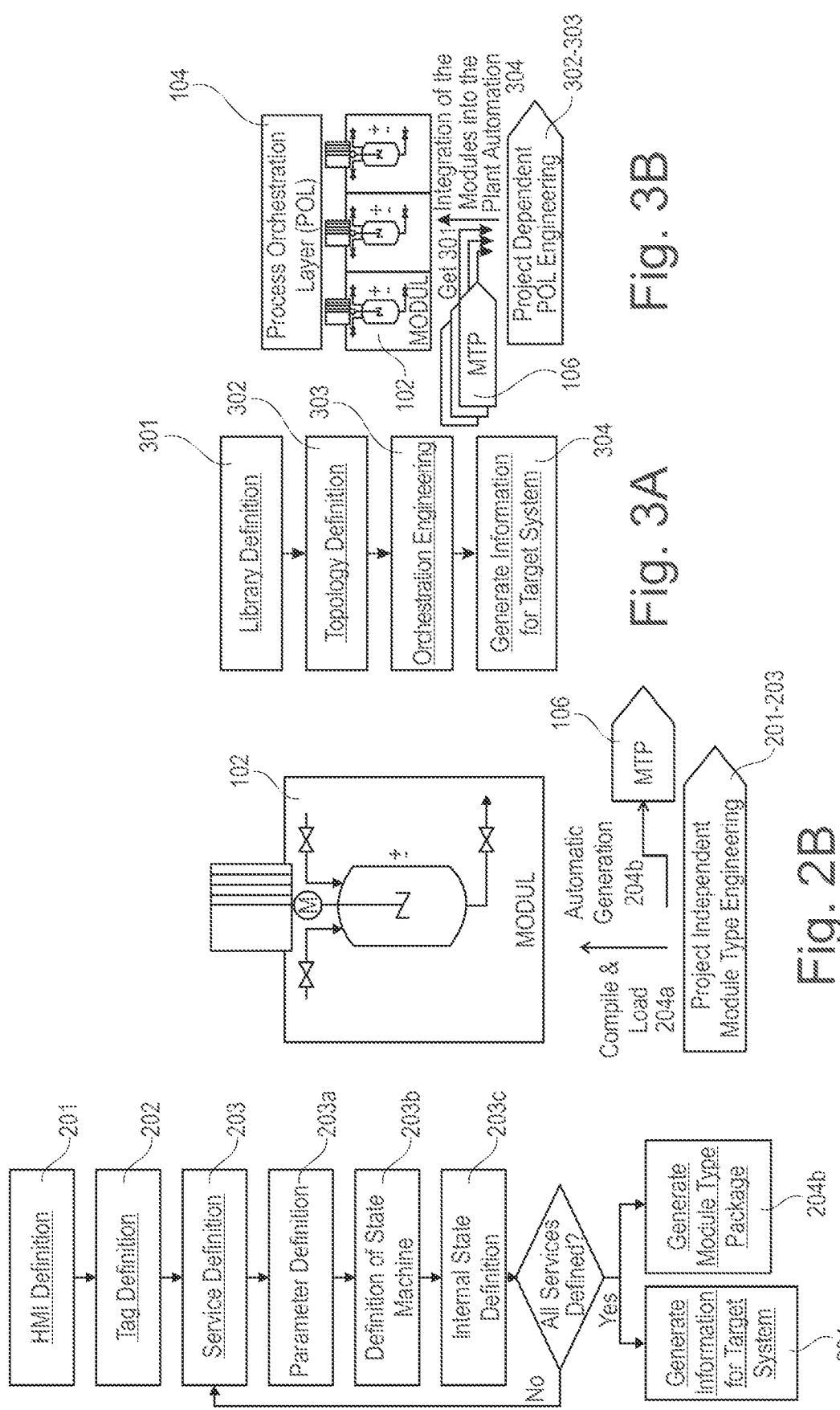

Fig. 5

CONFIGURATION OF A MODULAR PLANT

CROSS-REFERENCE TO PRIOR APPLICATIONS

This patent application is a continuation of copending U.S. patent application Ser. No. 17/369,993, filed Jul. 8, 2021, which claims priority to European Patent Application No. 20185014.6, filed on Jul. 9, 2020, the disclosures of which are hereby incorporated by reference herein in their entireties.

FIELD

The present invention relates to providing a control software configuration for a module of a modular plant in a module engineering phase, and configuring a modular plant in a plant engineering phase.

BACKGROUND

Modular plants are an established aspect of Industry 4.0 and provide benefits not only with respect to development cost but also with respect to time and material efforts. An integral layer of the modular plant structure consists of prefabricated and well-tested modules called PEAs (Process Equipment Assembly), that can readily be assembled in different combinations to realize different target systems. PEAs are typically provided with their own intelligence to provide all necessary functions for safe decentralized operation. Data exchange between PEAs is realized via a standardized interface description called Modular Type Package (MTP). The MTP approach creates the framework for interoperability between modules and the orchestration system, enabling process plants to be built up and engineered in a more modular way, with the goal of simplifying process plant engineering and life cycle management.

SUMMARY

In an embodiment, the present invention provides a method of providing a control software configuration for a module of a modular plant, the method comprising, in a module engineering phase: receiving a user definition for the module; and automatically generating the control software configuration for the module based on the user definition, the automatically generating comprising: specifying parameters for the module that are not specific to any target system; and providing the control software configuration as a controller-agnostic configuration file for subsequent binding of controller software instantiated according to the controller-agnostic configuration file to a hardware controller of the module when the module is integrated into a target system during a plant engineering phase.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIGS. 2A and 2B illustrate a module type engineering workflow;

FIG. 3A and FIG. 3B illustrate a plant engineering workflow;

FIG. 5 illustrates tag definition in the module type engineering workflow;

DETAILED DESCRIPTION

Figure 1:
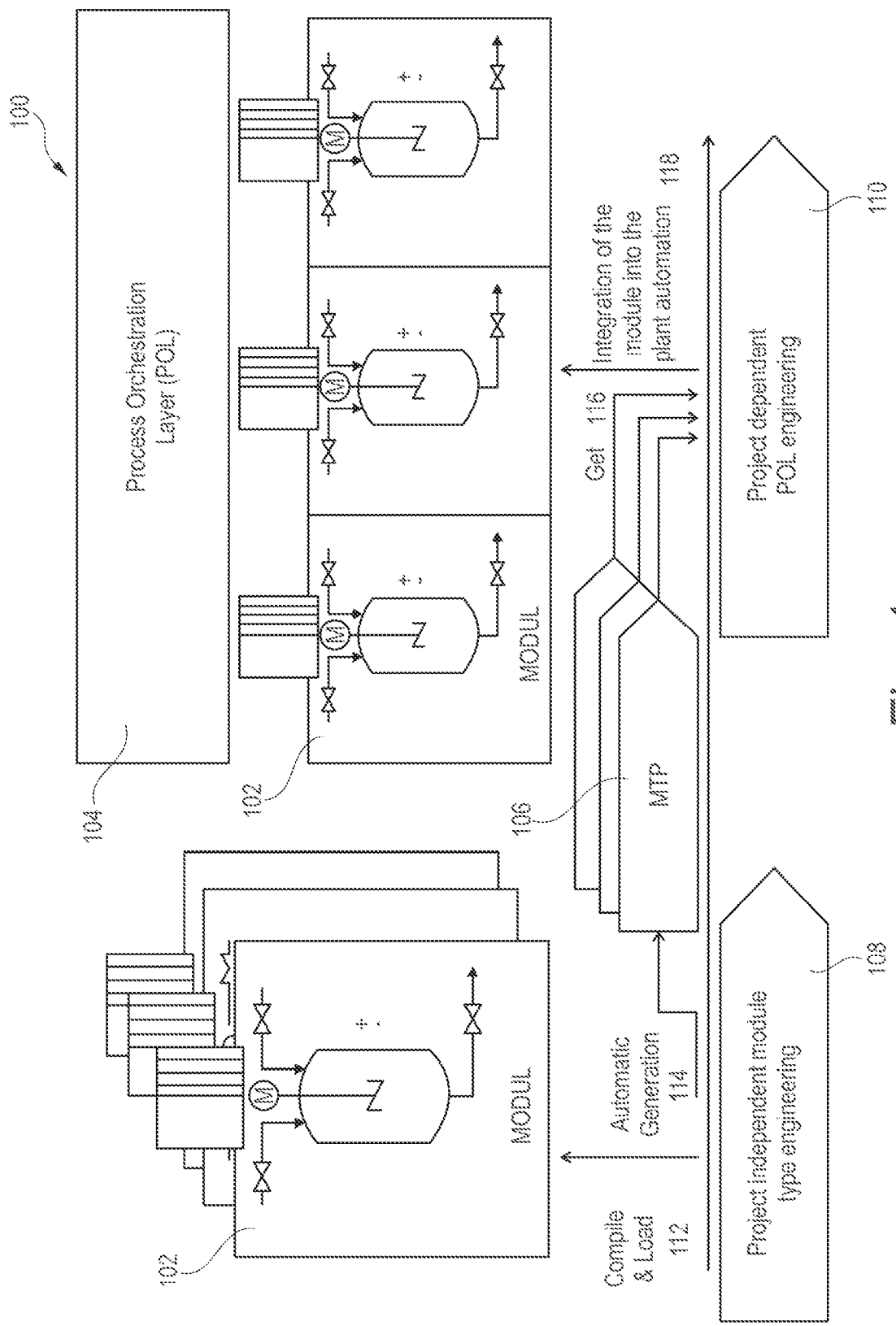
FIG. 1 illustrates an engineering workflow for modular plants.

Notwithstanding the desire for modularization, the inventors have made the surprising recognition that plant owners typically design, create and calibrate their own modules individually, often expending significant effort in the subsequent assembly of these modules in the overall plant. The modules are then bound to a specific control system for the automation of the module interior function. Reuse of the software of a PEA is therefore hardly possible because of automation vendor binding. Every PEA is typically given its own intelligence, by means of a controller and embedded OPC UA Server. The controllers are used to automate the process functions from the PEA and expose the functions using service-oriented architecture and state-based control for the supervisory system. Binding the PEAs to specific hardware and adding a controller to each PEA brings high investment costs and vendor dependency.

The inventors have recognized that it would be advantageous to solve some or all of these problems. In an embodiment, the present invention therefore provides a method of providing a control software configuration for a module of a modular plant and a method of configuring a modular plant, along with a computer and a computer program product, as described herein.

In a first aspect, there is provided a method of providing a control software configuration for a module of a modular plant, the method comprising, in a module engineering phase: receiving a user definition for the said module; and automatically generating the control software configuration for the said module based on the user definition, comprising specifying parameters for the said module that are not specific to any target system, and providing the control software configuration as a controller-agnostic configuration file for subsequent binding of controller software instantiated according to the controller-agnostic configuration file to a hardware controller of the said module when the said module is integrated into a target system during a plant engineering phase.

In a second aspect, there is provided a method of configuring a modular plant, the method comprising, in a plant engineering phase: receiving a user definition for the modular plant as a target system, the definition identifying modules to be integrated into the modular plant according to the user definition, wherein at least one said module is associated with a controller-agnostic configuration file specifying parameters for the said module that are not specific to any target system; and automatically binding controller software instantiated according to the controller-agnostic configuration file to a hardware controller of the said module of the target system, the binding comprising automatically adapting the parameters to the target system according to the user definition.

By "controller-agnostic" is meant that the configuration file is not yet bound to a specific hardware controller on which the control software is to run, nor to the target system of which that hardware controller forms a part. The configuration file, as well as the control software configuration itself, can thus be described as being agnostic/independent of, or abstracted from, the (details of the) controller/hardware/module/target system. In other words, the control software configuration and the configuration file include only generic details of a controller/hardware/module/target system that could apply to any such element, and/or only details pertaining to a certain class/type/kind of controller/hardware/module/target system that will be exhibited by any such element of that class/type/kind. The control software configuration may also be referred to as an automation software configuration. In one example described further below, the control software configuration is provided by a virtual PEA/function module, and the controller-agnostic configuration file by a generic MTP. The control software configuration thus exists as a definition of control software decoupled from the hardware controller on which the software will run, thereby promoting software reusability, reducing or eliminating vendor dependency, and reducing development/investment costs.

Controller agnosticity may be provided in such innovative ways as omitting controller-specific parameters and/or controller-specific logic functions from the configuration file, and/or providing in the configuration file default parameters and/or default logic functions for later adaptation during plant engineering to a specific controller/hardware/module/target system, and/or providing parameters and/or default logic functions which are static/constant in that they apply to all controllers/hardware/modules/target systems (or to all controllers/hardware/modules/target systems of a certain type) and which will thus remain unchanged during subsequent plant engineering, despite integration of the modules into the target system. The parameters specify states of a state machine defining an application to be executed by the said module. Thus, in one example, the parameters comprise one or more of (i) default parameters for adaptation to the target system during the plant engineering or (ii) static parameters that will remain unchanged during the plant engineering. Additionally or alternatively, an application to be executed by the said module defines logic that is predetermined to be executable independently of state machines defining the application, in other words that is executable independently of the service and the (specifics of the) state-machine controlling the service, and therefore executable independently of the details of the target system.

In an example, the controller-agnostic configuration file furthermore advantageously specifies one or more of the following for the said module: (i) one or more parameters, (ii) one or more variables, (iii) one or more views; (iv) one or more state machines; (v) one or more applications; (vi) one or more events; (vii) one or more methods; (viii) one or more signal references; (ix) one or more signal outputs.

In an example, the binding further comprises matching input/output signals. The binding may comprise one or more of (i) assigning a further instance of controller software, instantiated according to a further such controller-agnostic configuration file, to the same hardware controller of the said module, and (ii) assigning the controller software additionally to a hardware controller of a further module of the target system. Such flexibility does not exist in the prior systems in which the modules are inherently bound to a specific control system.

In an example of the first aspect, the method further comprises simulating execution of the said module in a virtual control environment for testing. The virtual control environment may comprise one or more of (i) a soft controller of a specific target system; (ii) a software representation of the said module; (iii) a debugging function. The ability to perform such testing in virtual environments, as well as virtual plant orchestration, is facilitated by the controller-agnostic nature of the described control software configuration, not yet being bound to any specific hardware controller.

In an example, the said module comprises a Process Equipment Assembly (PEA). The PEA can in one example form part of a distributed control node (DCN). In any of these examples or in others, the controller-agnostic configuration file may comprise a Modular Type Package (MTP) defining the PEA/DCN, for example as a generic MTP.

In an example of the first aspect, the method further comprises, in a workflow for project execution: testing the control software configuration as defined by the controller-agnostic configuration file; attaching an input/output configuration to the control software configuration at the modular plant; testing the input/output configuration in conjunction with the control software configuration on a virtual controller; assigning a hardware controller to an instance of the software controller instantiated according to the controller-agnostic configuration file; adding physical input/output to the hardware controller and software controller instance; and adding pretested supervisory control and/or orchestration for plant control. Project execution is thus greatly facilitated by the controller agnosticity described herein.

In a third aspect, there is provided a computer comprising a processor configured to perform the method of any preceding aspect.

In a fourth aspect, there is provided a computer program product comprising instructions which, when the program is executed by a processor of a computer, cause the computer to perform the method of any of the first and second aspects.

In a fifth aspect, there is provided a data structure defining a control software configuration for a module of a modular plant, the control software configuration specifying parameters for the said module that are not specific to any target system, the data structure being formatted as a controller-agnostic configuration file for subsequent binding of controller software instantiated according to the controller-agnostic configuration file to a hardware controller of the said module when the said module is integrated into a target system during a plant engineering phase. In one example, the virtual PEA/function module described herein may be viewed as a data structure defining the described control software configuration for a module of a modular plant. The data structure may comprise all and any aspects and elements of the control software configuration embodied as the virtual PEA/function module described herein. In this regard, the data structure provides functional data that serve to control the operation of the module processing the data, and therefore inherently comprises corresponding technical features of the module.

Further aspects and examples of the invention will become apparent from and be elucidated with reference to the embodiments described hereinafter.

Modular plants may be engineered. The engineering workflow 100 is split into two parts: (project-independent) module type engineering workflow 108 and (project dependent) plant engineering workflow 110. The module type engineering workflow 108 may be undertaken by a module supplier or by the owner of the modular plant. The plant engineering workflow 110 may be undertaken by the plant owner.

Within the module type engineering workflow 108, all engineering for a module type/PEA 102 is done, meaning: instrumentation, electrical, control engineering; physical connection of the inner process equipment; I/O marshaling and selection of the controller hardware; factory acceptance testing. A module type 102 is after its creation at 112 ready for use within a plant, because it provides an own intelligence and OPC UA server interface that can be used for controlling it. The interface of every module type 102 is described by generating at 114 an MTP 106, for example according to IEC63280 ED1 ACD. Every module type 102 uses services to expose its inner functions to the supervisory control system as services. A service-oriented architecture may be used. Behind every service, a defined state machine is executed and the states are exposed.

The MTP 106 is later used for the second part, the plant engineering workflow 110, where the MTPs 106 of the module types 102 are imported 116 and instances for the module types 102 are created, before being integrated at 118 into the plant automation. The decentralised automation of the different module types 102 is integrated in a Process Orchestration Layer (POL) 104.

FIGS. 2A and 2B illustrate the module type engineering workflow 108 in more detail. In order to engineer a module type 102, the human-machine interface (HMI) of the module type is first defined at 201, which may resemble for instance the engineering of a piping and instrumentation diagram. From the HMI, a tag list is automatically derived at 202. The tag list contains all tags that are used within the automation system. In the tag list, the user can change the parameters of the tags. Both, the tag type and the parameters may be compliant to IEC 63280 ED1 ACD. In the third step 203, the services for the module type 102 are defined. This begins with adding a service and additionally adding necessary service parameters at 203a that should be exposed to the supervisory control system. Service parameters might be for example "Amount" for a service "Fill", which is used to tell the "Fill"-service how much should be filled into the module. After the definition of the service, the state of the underlying state machine is filled with logic at 203b, 203c. The logic definition is still not bound to a target system but will later be used in steps 204a and 204b to create the target system specific information. In step 204a, the target system specific information is created and can be used for the automation of the module type 102. This is now bound to the target system and the target system cannot be exchanged later on during plant engineering. In step 204b, a target system specific MTP 106 is created that describes the interface of the module type 102.

FIG. 3A and FIG. 3B illustrate the plant engineering workflow 110 in more detail. The plant engineering workflow 110 also follows a four-step approach, where, in the first step 301, all module types 102 required in the plant are added to a module library. After adding the module types 102, defined by their MTPs 106, those can be used at 302 to create a topology of the modular plant, by creating module instances in the engineering tool and connecting them by means of material and information flow. At 303, the module instances can be used to define—based on their services—sequences that can be executed by the supervisory control system, POL 104. The supervisory control system 104 is in the last step 304 created from the information from the engineering tool.

Figure 4:
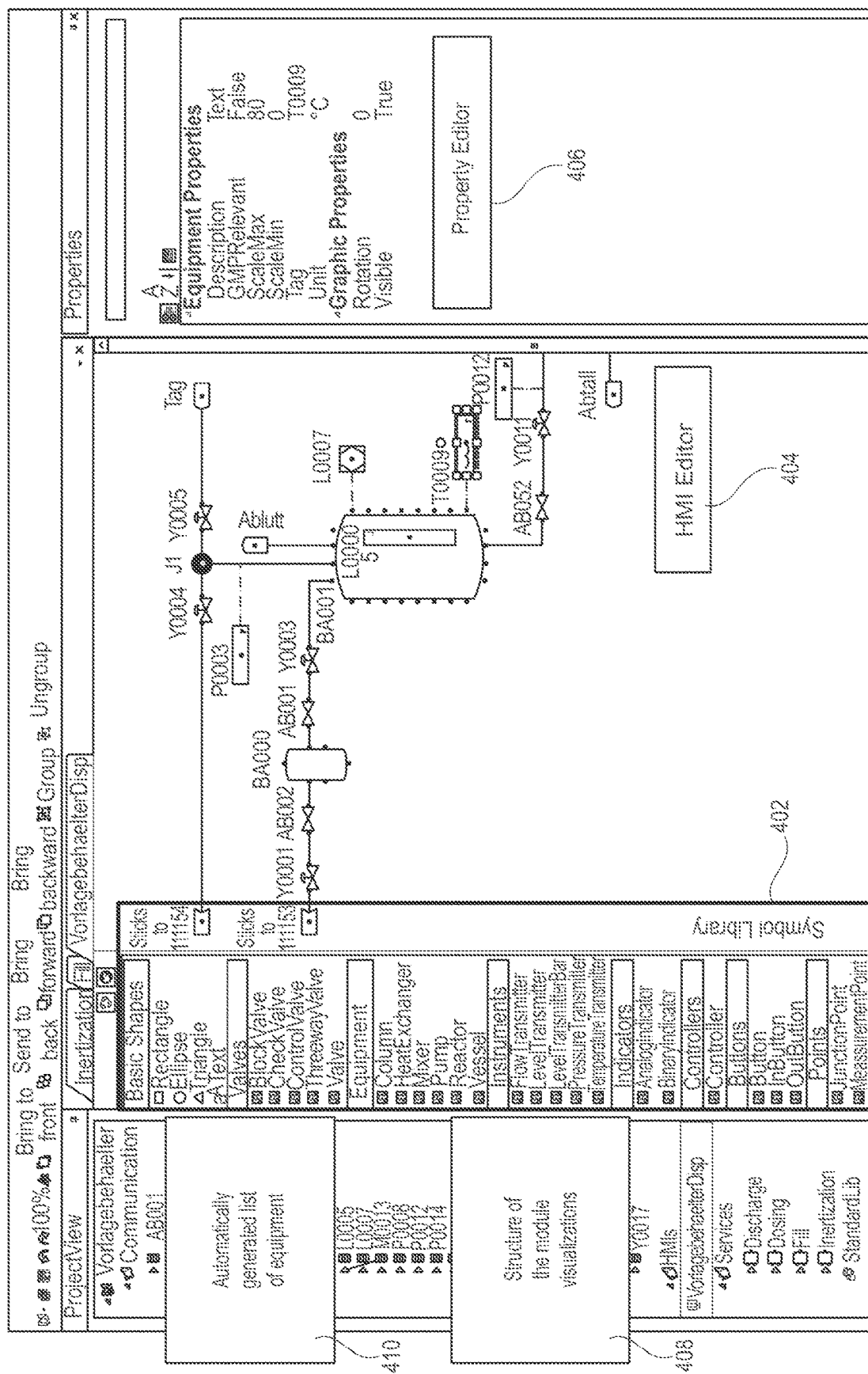
FIG. 4 illustrates HMI definition in the module type engineering workflow.

FIG. 4 illustrates the HMI definition 400 of a module type 102, corresponding to step 201 of the module type engineering workflow 108. The HMI editor 404 in conjunction with the symbol library 402 and the property editor 406 assists the user in defining the HMI. A list of equipment 410 is automatically generated and illustrates the structure 408 of the module visualizations.

Figure 5:
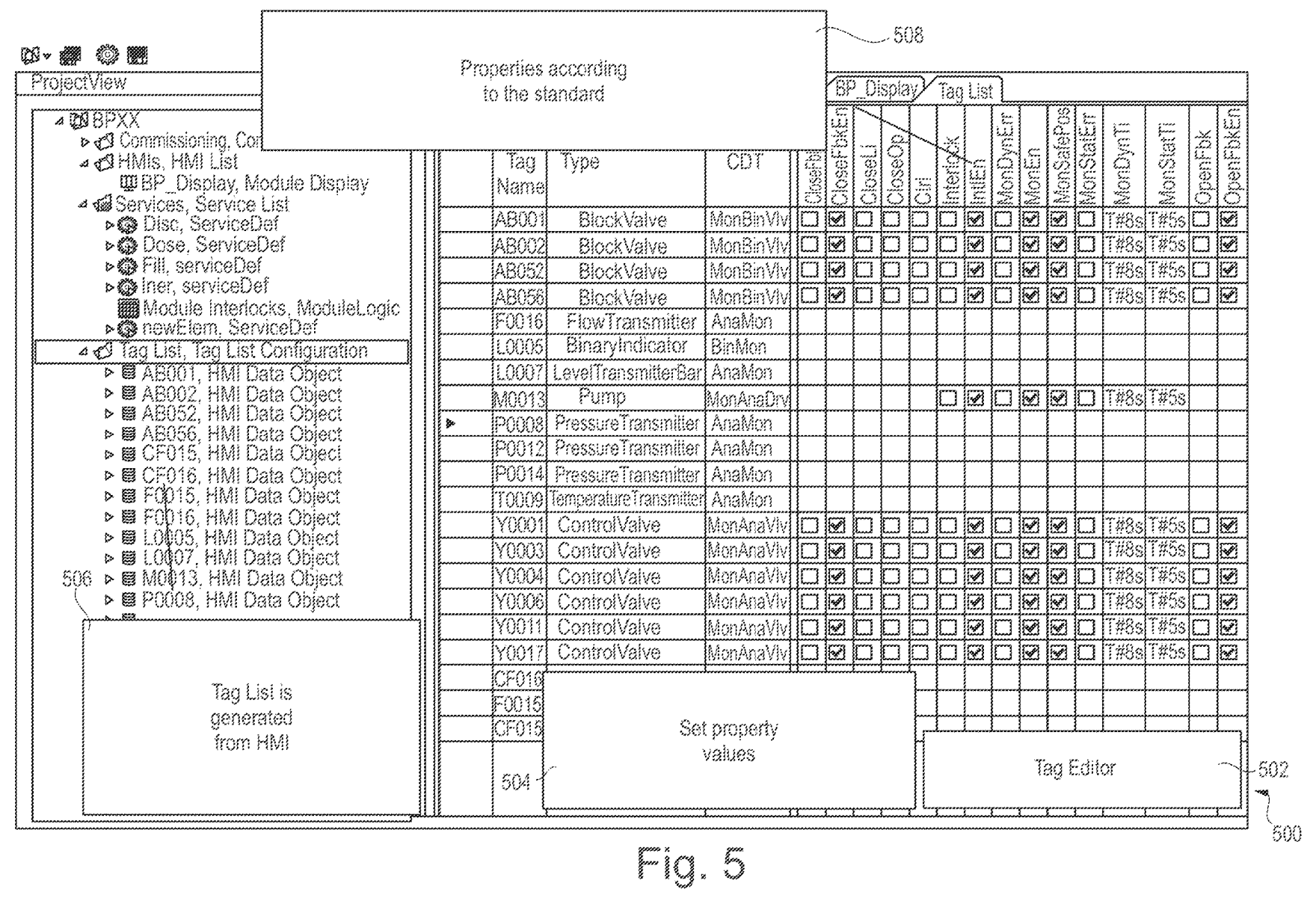

FIG. 5 illustrates the tag definition 500 in the module type engineering workflow 108, the engineering of the tag list, corresponding to step 202. The tag editor 502 generates a tag list 506 from the HMI and presents properties 508 according to the relevant standard, allowing the user at 504 to set property values.

Figure 6:
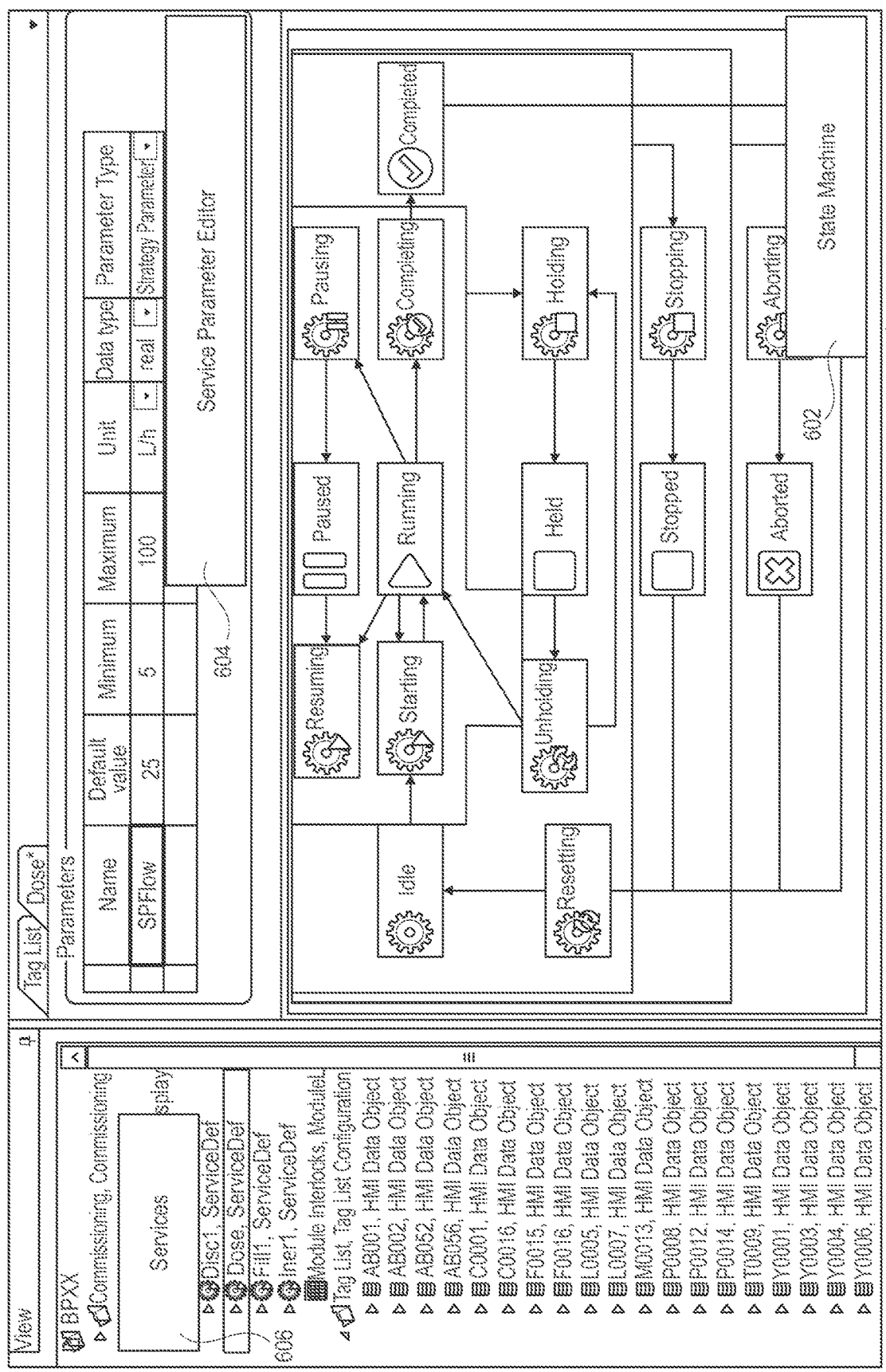
FIG. 6 illustrates service definition in the module type engineering workflow.

FIG. 6 illustrates the service definition 600 of a module type, comprising definition of the service and the service parameters, corresponding to steps 203a and 203b of the module type engineering workflow 108. The user is able to define at 604 the state machine for the service, choosing from a list of available services 606, and set service parameters using the service parameter editor 604.

Figure 7:
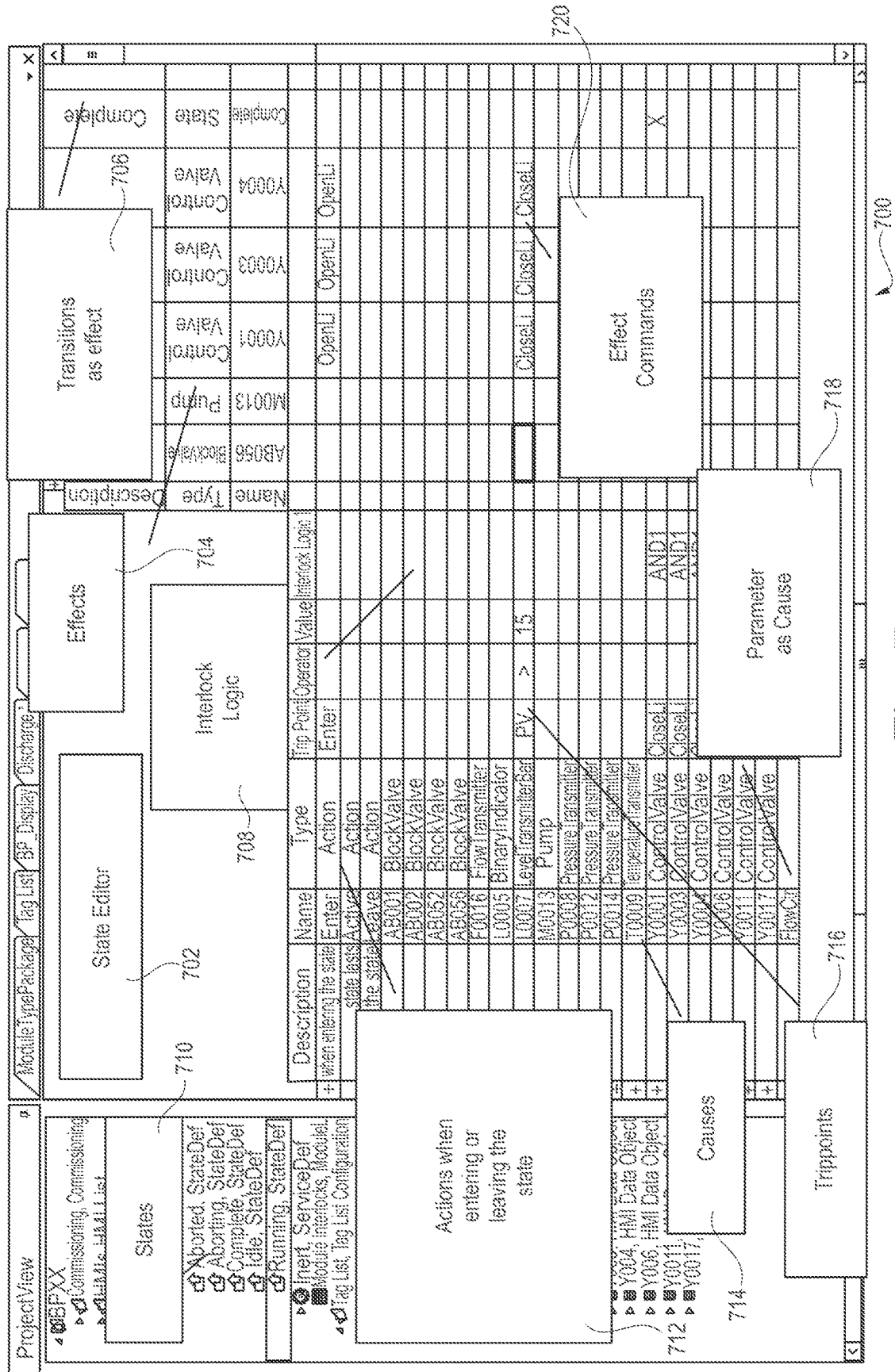
FIG. 7 illustrates state definition in the module type engineering workflow.

FIG. 7 illustrates the state definition 700 of a state of a service state machine for a module type 102, according to step 203c of the module type engineering workflow 108. The state editor 702 allows the user to choose from various defined states 710, to define actions 712 when entering or leaving the state, to specify causes 714, parameters 718 as cause, trip points 716 and interlock logic 708 for each state, as well as effects 704, transitions as effect 706, and effect commands 720.

Figure 8:
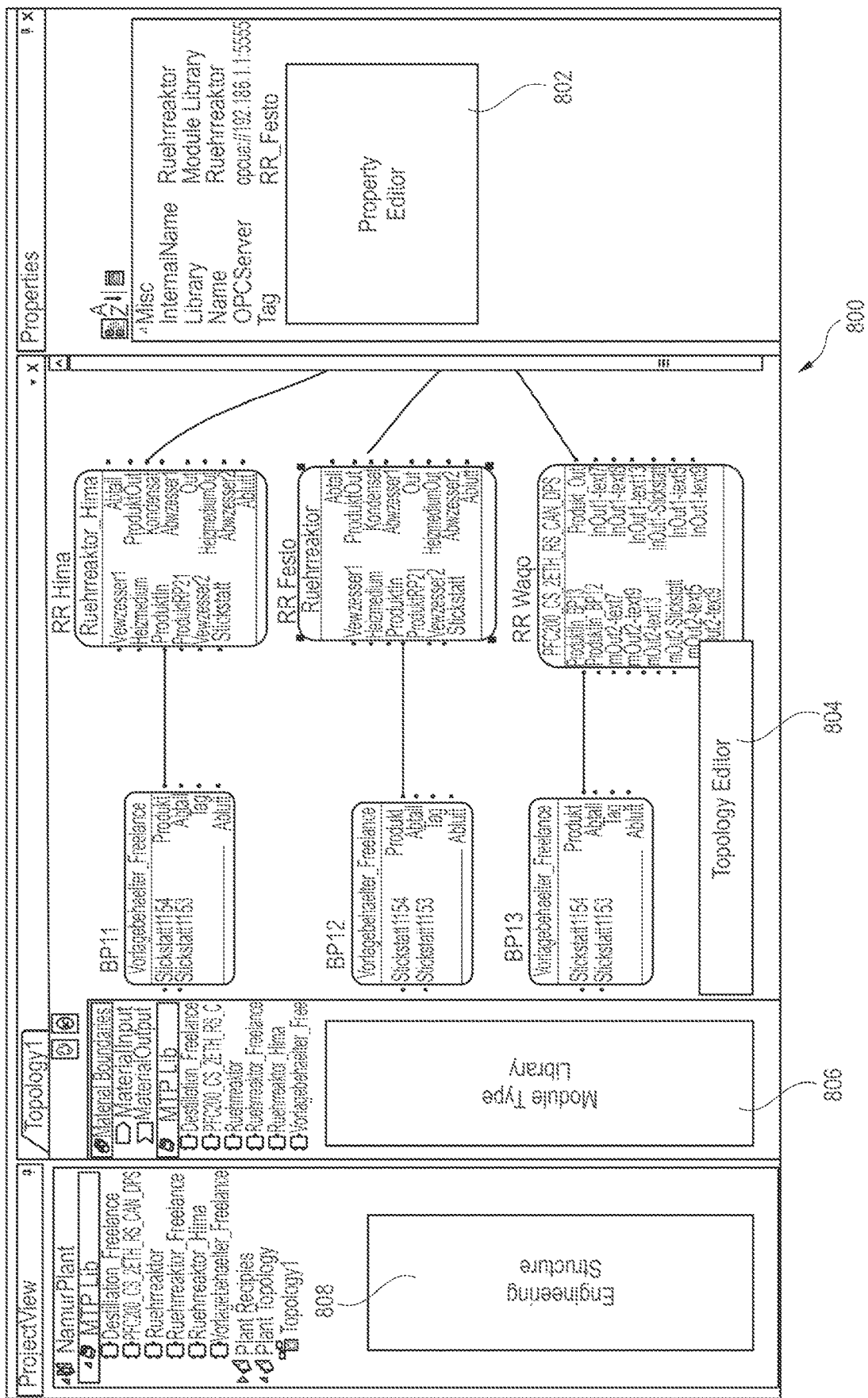
FIG. 8 illustrates topology definition in the plant engineering workflow.

FIG. 8 illustrates the topology definition 800 of a modular plant, according to step 302 of the plant engineering workflow 110, in which the user can use the property editor 802 and the topology editor 804 to work on the previously-defined module type library 806 to define the engineering structure 808.

Figure 9:
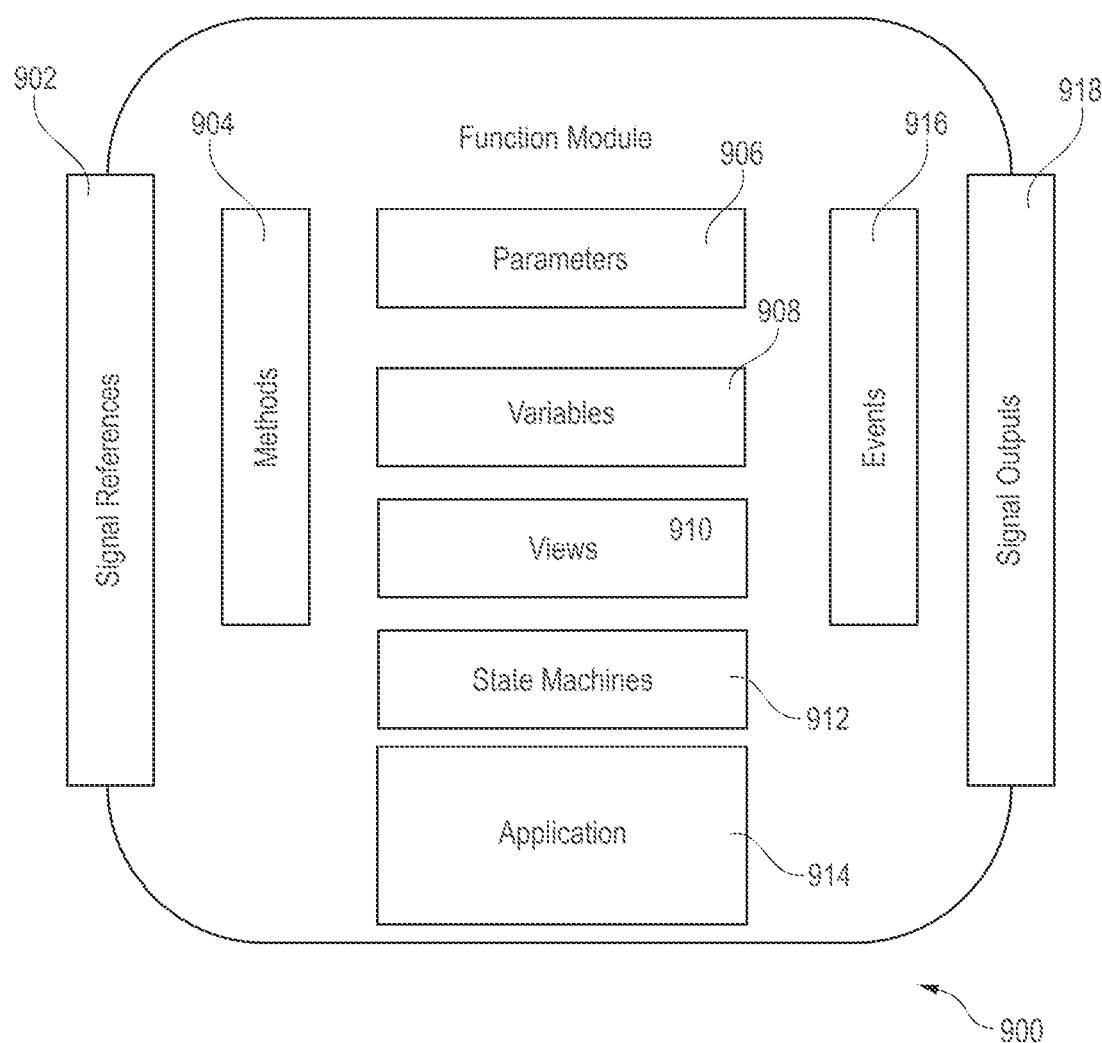
FIG. 9 illustrates content of a virtual PEA/function module.

FIG. 9 shows the content of a virtual PEA/function module 900. The inventors have developed the virtual PEA/function module 900 as a software description of a module type 102. Broadly speaking, the virtual PEA/function module 900 serves as a control software configuration for a module 102 of a modular plant, specifying parameters for the said module that are not specific to any target system, such as default parameters. The virtual PEA/function module 900, serving as the control software configuration, is provided as a controller-agnostic configuration file, in other words a target-system-independent configuration file—in one example a generic MTP 106—for subsequent binding of controller software instantiated according to the controller-agnostic configuration file to a hardware controller of the said module when the said module is integrated into a target system during plant engineering.

More particularly, instead of having a binding to a specific target system, the virtual PEA/function module 900 contains only the description of the functionality which the target system should contain. For example, the virtual PEA/function module 900 may contain the same information as the module type 102 described above, in addition to information concerning the logic that is executed inside the states of the services (application 914 in FIG. 9). The application 914 includes the states executed in the overarching state machine. Only the state machine is externally visible. The states are defined as extended cause-and-effect matrices, as for the module type 102 described above. The application 914 optionally also contains logic that is predetermined to be executable independently of the state machines. In one example for equipment protection, if for example a valve is closed, all succeeding pumps have to be stopped to prevent them from running dry. Further examples of logic that is predetermined to be executable independently of the state machines includes opening a release valve in response pressure in a vessel becoming too high, and opening a release valve to flare in response to too much pressure in a gas pipeline. This kind of logic has to be executed always and independently of the services and the (specifics of the) state-machine controlling the service. Further such examples will be apparent to the skilled reader and are encompassed by this disclosure, which should not be taken as limiting to any one such example. This enables the virtual PEA/function module 900 to be portable to different kinds of target system, because the application 914 that should be executed within the states is not yet bound to any target system. The parameters may further specify communications for the target module 102.

For every control equipment (sensor, valve, etc.) used in the module, a set of parameters is defined. There may be different kinds of parameters for the module that are not specific to any target system, as in the following non-limiting examples. Further such examples will be apparent to the skilled reader and are encompassed by this disclosure, which should not be taken as limiting to any one such example.

A sensor for example has a range, meaning it can measure 1 . . . 10 bar. These parameters depend on the final hardware used—a sensor cannot measure outside its measuring range. Those parameters are set once, when later (during plant engineering) the target system and the devices are assigned, and remain constant. When in different instances of the function module different sensor types are used to measure the pressure, this parameter is later adapted (e.g. during plant engineering) when the target hardware and devices are assigned to the function module instance (as an instance of a software controller instantiated according to a controller-agnostic configuration file). The block controlling a sensor can specify limits. A limit is a software-defined number that must be inside the measuring range. It can be used to raise alarms if the measure value is over/under a defined limit. These limits can be parameterized everywhere in the application. In one non-limiting example, to provide parameters that are not specific to any target system, default limits may be set, and later changed, if necessary. A typical case is that, during startup, the limits are set broader to avoid alarm floods and once the module is running in steady-state, the limits are narrowed down to keep the process in an optimal operating state.

A service might have parameters for configuration of how it should perform, e.g. the process value is measured inside the module or comes from somewhere else. The configuration parameters may show which of the sources is used. In one non-limiting example of a parameter that is not specific to any target system, a default source may be specified, in order to provide a defined state for the case in which no further parameterization is performed. Alternatively, the parameter may be forgotten during adaptation. In another non-limiting example, default service parameters may be given for setpoints, e.g. the fill service should fill the vessel to 50%.

All the above-described parameter types are typically exposed as OPC UA variables by the OPC UA server of the module. Since the OPC UA Server does not exist in the virtual PEA/function module 900, and is only later added to the function module instance, the engineer can set default values to the parameters. Those can be (i) subsequently changed during plant engineering, (ii) provided by the actual OPC UA server of the assigned target system, or (iii) set for every state of the state machines or for every service or module wide (i.e. only one parameter value is given that is used for all operating states).

As shown in FIG. 9, the virtual PEA/function module 900, provided as a controller-agnostic configuration file, for example in the form of a generic MTP 106, specifies one or more of the following for the target module 102: (i) one or more parameters 906, (ii) one or more variables 908, (iii) one or more views 910; (iv) one or more state machines 912; (v) one or more applications 914; (vi) one or more events 916; (vii) one or more methods 904; (viii) one or more signal references 902; (ix) one or more signal outputs 918.

The virtual PEA/function module 900 thus provides for automation of PEAs that do not have an embedded controller and OPC UA server. The automation of the virtual PEA/function module 900 can be carried out in a central or distributed control system and it is possible to have several virtual PEAs/function modules 900 on one controller. The virtual PEA/function module 900 decouples the control application software from the controller and input/output hardware of a PEA. Instead of binding the control application software to hardware as a controller, input and output hardware design may be performed in later steps. The software description may be exported as the virtual PEA/function module 900 into a controller-agnostic (in other words hardware-independent) MTP 106. During plant engineering, the virtual PEA/function module 900 can then be assigned to a controller and input/output signals can be matched. Thus, it may also be possible to assign several virtual PEAs/function modules 900 to a single controller and to reuse the virtual PEA/function module 900 with another vendor or target system later.

Figure 10:
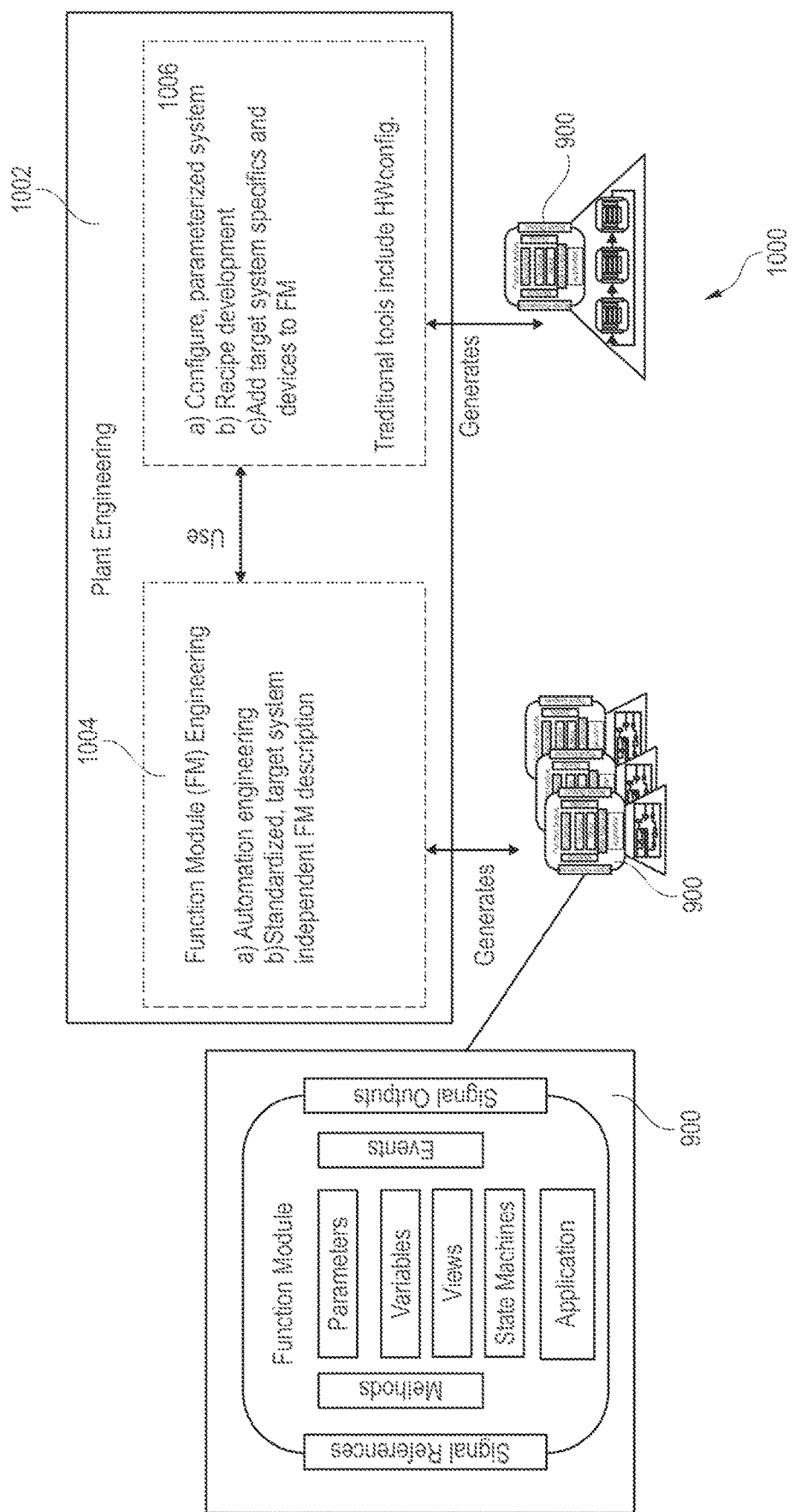
FIG. 10 illustrates the engineering workflow as executed using the virtual PEA/function module.

FIG. 10 illustrates the engineering workflow 100 as executed using function modules 900. In this example, the function module engineering workflow 1004 is carried out by a plant engineering tool 1002. The interface between the function module engineering 1004 and the plant engineering tool 1002 may be provided by the controller-agnostic MTP 106 of the function modules 900.

The function module engineering workflow 1004 using the virtual PEA/function module 900 is as the module type engineering workflow 108 described above, except that step 204a of the module type engineering workflow 108 is not executed, and that step 204b—to account for the target system being unknown, and instead of generating a target system specific MTP—comprises generating an MTP 106 without the target system specific information. This generic MTP 106 is then used to describe the function module. The MTP 106 may be XML-based. In FIG. 10, step (a) of the function module engineering workflow 1004 corresponds to steps 201-203 of the module type engineering workflow 108. Step 1004(b) corresponds to step 204b, except that the generic MTP 106 is generated. Steps 204b/1004(b) may be performed by a computer. Broadly speaking, the function module engineering workflow 1004 involves a method of providing a control software configuration for a module of a modular plant, the method comprising: receiving a user definition for the said module; and automatically generating (1004(b) the control software configuration (e.g. the virtual PEA/function module 900) for the said module based on the user definition, comprising specifying parameters for the said module that are not specific to any target system, and providing the control software configuration as a controller-agnostic configuration file (e.g. the generic MTP 106) for subsequent binding of controller software instantiated according to the controller-agnostic configuration file to a hardware controller of the said module when the said module is integrated into a target system during a plant engineering phase.

The plant engineering workflow 1006 using the function module 900 is undertaken as described above, except that step 304 is executed also in relation to instances of function modules 900 used inside the modular plant. Step 1006(*a*) comprises adding function module instances (as instances of software controllers instantiated according to respective controller-agnostic configuration files) to a plant. Cycling through the parameters, as described above, the parameters are adapted to the needs of the plant. The result is a topology of function module instances (still pure software) which shows how those are physically connected and instance parameters are adapted to the needs of the plant. In step 1006(*b*), a recipe is created that shows when which service of which module is to be executed, stopped, paused, etc. The engineer can define the orchestration of the function module instances in sequences that can later be executed in the plant automation system. In step 1006(*c*), the (hardware) controller to execute the function module instances is selected. The function module instances may be executed on separate controllers of different type (even different vendors) or several function module instances may be executed on the same controller. The control software configuration of a particular function module instance is downloaded or exported to the selected controller automatically. The controller-specific parameters necessary for the specific control system are added automatically to the respective function module instance once the controller is assigned. In addition, the process devices are assigned to the sensors and equipment defined in the function module instance. Here, for example, a physical sensor such as a laser level transmitter is assigned to the planned items from the function module instance. Additionally, device-specific parameters are automatically adapted from their default settings (e.g. the measuring range, as described above). Broadly speaking, the plant engineering workflow 1006 involves a method of configuring a modular plant which comprises, in a plant engineering phase: receiving a user definition for the modular plant as a target system, the definition identifying modules to be integrated into the modular plant according to the user definition, wherein at least one said module is associated with a controller-agnostic configuration file specifying parameters for the said module that are not specific to any target system; and automatically binding controller software instantiated according to the controller-agnostic configuration file to a hardware controller of the said module of the target system, the binding comprising automatically adapting the parameters to the target system according to the user definition. Thus, within the plant engineering, every instance of the virtual PEA/function module 900 is assigned to a specific target system, which is a new step in the engineering workflow. The actual binding to the target system is then performed in the final step, at the same time as the generation of the operations environment (steps 304/1006(*c*) in the plant engineering workflow 110). This very late binding has the advantage that the virtual PEA/function module 900 is not bound to any target system and can be assigned to any supported target system. Additionally, multiple virtual PEAs/function modules 900 can be assigned to a single target system, which saves hardware costs.

Figure 11:
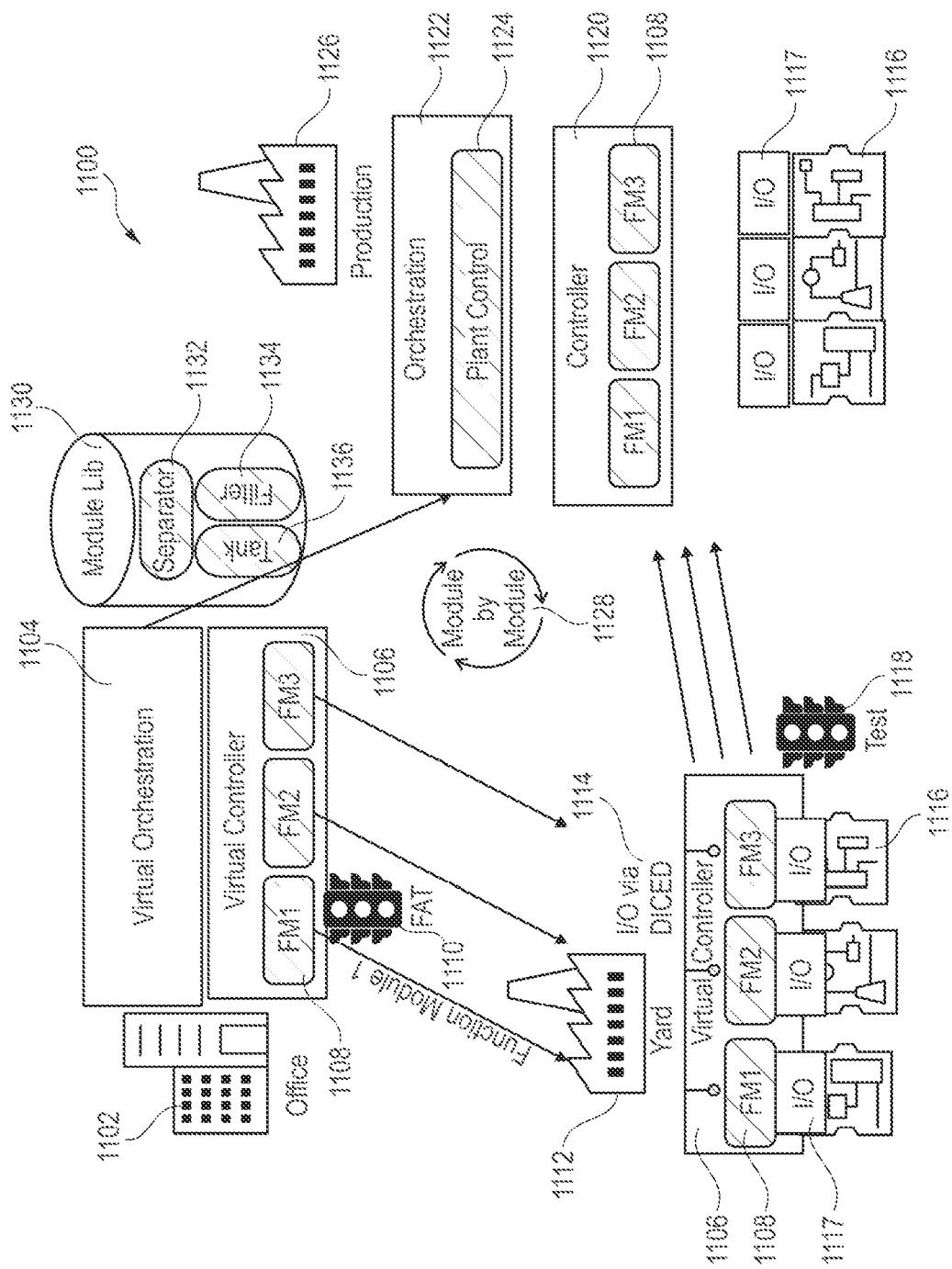
FIG. 11 illustrates project execution using the virtual PEA/function module.

FIG. 11 illustrates project execution 1100 using the virtual PEA/function module 900. The function modules 1108 are first developed in the office 1102 and "staged" in a virtual control environment 1106, which might involve simulation, emulators for target systems, or other debugging environments, and which may involve a Factory Acceptance Test (FAT) 1110. Modules are optionally developed using a module library 1130 storing function modules (e.g. 1132, 1134, 1136) already engineered within other projects/plants and reusable within the plant under development. After their development, the function modules 1108 are handed over to the yard 1112, where the necessary physical I/Os 1116, 1117 are assigned to the function modules 1108. For example, I/O may be assigned at 1114 using a DICED approach: I/O with automatic Detect, Interrogate, Configure, Enable, and Document. Until the assignment of physical I/Os, development may be undertaken in the virtual control environment 1106. Additionally, given that the function modules exist as pure software, the orchestration can be at least partially undertaken/prepared by way of a virtual orchestration 1104 (as in FIG. 10, plant engineering step 1006(*b*)). In the yard 1112, the function modules 1108 are tested at 1118 together with the physical I/Os 1116, 1117 and everything is shipped on site, where the target system binding is ultimately performed using the plant control 1124/orchestration engineering 1122 to bind the function modules 1108 to a hardware controller 1120 before they enter production at 1126. This workflow can be executed at 1128 in a way in which the function modules are developed one by one and sequentially. However, it is also possible to have a high degree of parallelization that enables for fast project execution.

Figure 12:
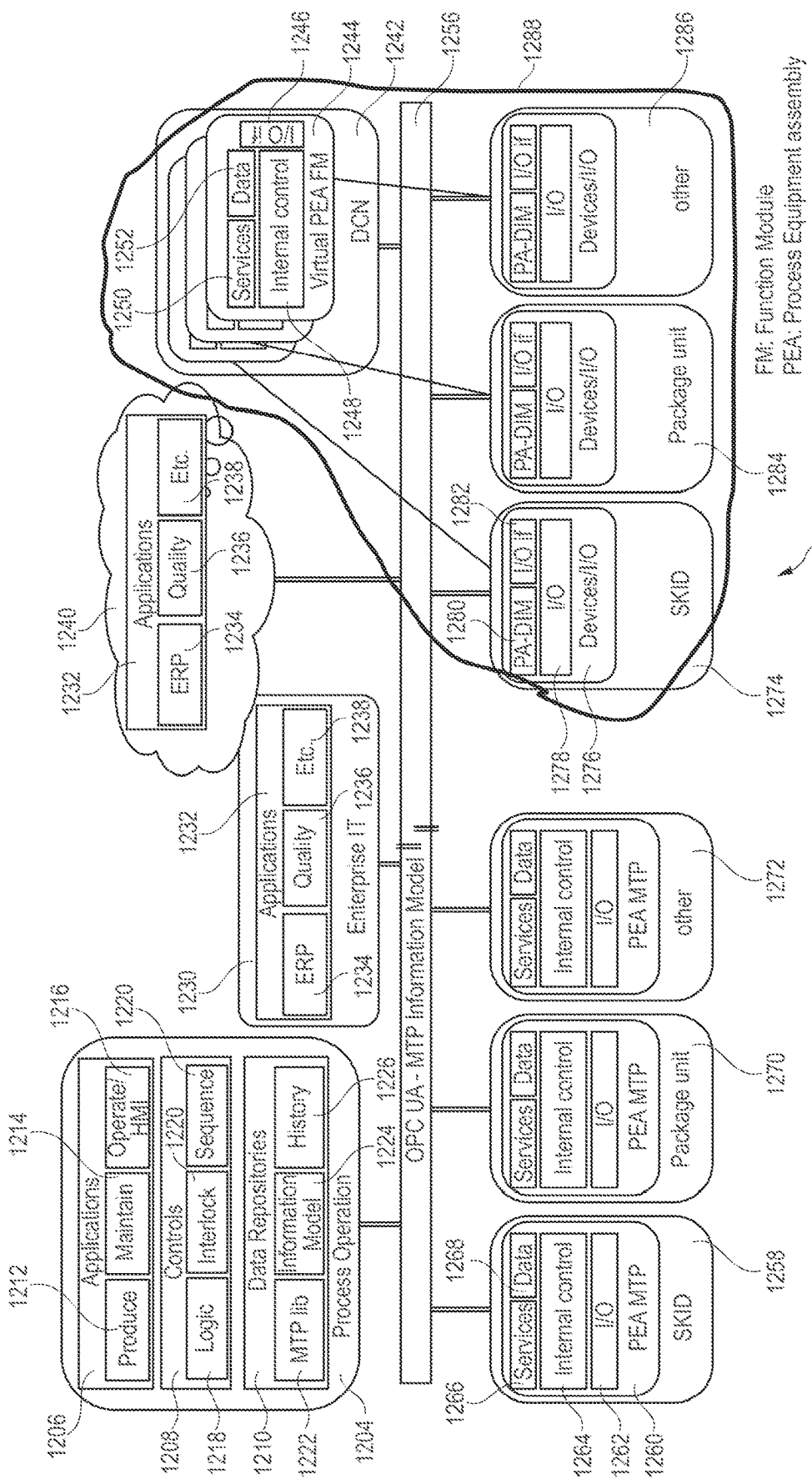
FIG. 12 illustrates the usage of function modules in the OPAF architecture.

Function modules 900 can be discussed in conjunction with current standardization activities. One prominent example is OPAF. In OPAF, the function modules/virtual PEA can be seen as part of a distributed control node (DCN) that can be executed for a skid, package unit or other type of module. FIG. 12 illustrates at 1200 the usage of function modules 1244 of the kind described herein in the OPAF architecture. Within a DCN 1242, several function modules 1244 can be executed, which might be used for the automation of several skids 1274, packaged units 1284 or other types of modules 1286 each comprising for example devices I/O 1276, I/O 1278, Process Automation Device Information Model (PA-DIM) 1280, and I/O if 1282. Within area 1288, the function modules 1244 are shown and the connection to the physical instances is shown. The usage in OPAF would complement the usage of PEAs in OPAF. The skilled reader will be familiar with other elements appearing in FIG. 12 such as applications 1232 comprising ERP 1234, quality 1236 and other 1238 forming e.g. part of Enterprise IT 1230; process operation 1204 with applications 1206 comprising produce 1212, maintain 1214, operate/HMI 1216, controls 1208 comprising logic 1218, interlock and sequence 1220, data repositories 1210 comprising MTP library 1222, information model 1224, and history 1226; skids 1258, package units 1270 and other modules types 1272 comprising PEA MTP 1260, I/O 1262, internal control 1264, services 1266, and data 1268. The various elements are brought together by the OPC UA-MTP information model 1256.

Developments made by the inventors include the virtualization of the PEA control application. Instead of having a hard binding between the PEA software and a specific target system, the virtual PEA contains all information necessary for a very late binding to the target system. Binding is done during plant engineering and the virtual PEA can be assigned to the needed target system. Same PEA types can be assigned to different target systems. It is possible to execute several virtual PEAs on the same controller. Developments made by the inventors can be summarized as follows:—

1. Concept of the virtual PEA/function module:
The virtual definition of the PEA described as target system independent MTP.
The information of a virtual PEA, which includes parameters, variables, view, state machines, applications, events, methods, signal references, signal outputs.
2. Concept for execution of virtual PEAs in a virtual control environment for testing:
The virtual control environment might be a soft controller of a specific target system.
The virtual control environment might be a software representation of the PEA.
The virtual control environment might be of another type (debugging function for instance).
3. Concept for late binding of the virtual PEA to a target system:
Binding during plant/orchestration engineering.
Assigning several virtual PEAs on a single controller.
Assigning same instances of virtual PEAs to different control system hardware (e.g. AC800M and AC500).
Assigning Input output signals to the virtual PEA.
4. Workflow for project execution using virtual PEAs/function modules:
Step 1: Engineering the virtual PEA in a virtual environment.
Step 2: Test virtual PEA.
Step 3: Attach required I/O (PA-DIM) to the virtual PEA instance at the yard.
Step 4: Test I/O configuration in conjunction with virtual PEA on virtual controller.
Step 5: Assign controller to the virtual PEA instances.
Step 6: Add physical I/O to the controller and virtual PEA instance.
Step 7: Add pretested supervisory control/orchestration for plant control.

From the above, it is clear that one or more computer programs, comprising machine-readable instructions, can be provided which when executed on one or more computers, cause the one or more computers to perform the automatically-performed steps of the described methods. Also, from the above it is clear that a non-transitory computer storage medium or computer program product, and/or a download product, can comprise the one or more computer programs. One or more computers can then operate with the one or more computer programs. One or more computers can then comprise the non-transitory computer storage medium/computer program product and/or the download product.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method of providing a control software configuration for a module of a modular plant, the method comprising, in a module engineering phase:
receiving a user definition for the module; and
automatically generating the control software configuration for the module based on the user definition, the automatically generating comprising:
specifying parameters for the module that are not specific to any target system; and
providing the control software configuration as a controller-agnostic configuration file for subsequent binding of controller software instantiated according to the controller-agnostic configuration file to a hardware controller of the module when the module is integrated into a target system during a plant engineering phase.

2. The method of claim 1, wherein the parameters comprise one or more of: (i) default parameters for adaptation to the target system during the plant engineering; or (ii) static parameters that will remain unchanged during the plant engineering.

3. The method of claim 1, wherein an application to be executed by the module defines logic that is predetermined to be executable independently of state machines defining the application.

4. The method of claim 1, wherein the controller-agnostic configuration file further specifies one or more of the following for the module: (i) one or more parameters; (ii) one or more variables; (iii) one or more views; (iv) one or more state machines; (v) one or more applications; (vi) one or more events; (vii) one or more methods; (viii) one or more signal references; (ix) one or more signal outputs.

5. The method of claim 1, further comprising:
simulating execution of the module in a virtual control environment for testing.

6. The method of claim 5, wherein the virtual control environment comprises one or more of: (i) a soft controller of a specific target system; (ii) a software representation of the module; (iii) a debugging function.

7. The method of claim 1, wherein the module comprises a Process Equipment Assembly or distributed control node.

8. The method of claim 7, wherein the controller-agnostic configuration file comprises a Modular Type Package defining the Process Equipment Assembly or distributed control node.

9. The method of claim 1, further comprising, in a workflow for project execution:
testing the control software configuration as defined by the controller-agnostic configuration file;
attaching an input/output configuration to the control software configuration at the modular plant;

testing the input/output configuration in conjunction with the control software configuration on a virtual controller;

assigning a hardware controller to an instance of the software controller instantiated according to the controller-agnostic configuration file;

adding physical input/output to the hardware controller and software controller instance; and adding pretested supervisory control and/or orchestration for plant control.

10. A method of configuring a modular plant, the method comprising, in a plant engineering phase:

receiving a user definition for the modular plant as a target system, the definition identifying modules to be integrated into the modular plant according to the user definition, at least one the module of the modules being associated with a controller-agnostic configuration file specifying parameters for the at least one module that are not specific to any target system; and automatically binding controller software instantiated according to the controller-agnostic configuration file to a hardware controller of the at least one module of the target system, the binding comprising automatically adapting the controller software to the target system according to the user definition.

11. The method of claim 10, wherein the binding further comprises matching input/output signals.

12. The method of claim 10, wherein the binding further comprises one or more of: (i) assigning a further instance of controller software, instantiated according to a further such controller-agnostic configuration file, to the hardware controller of the module; and (ii) assigning the controller software additionally to a hardware controller of a further module of the target system.

13. A computer comprising a hardware processor configured to perform the method of claim 1.

14. A non-transitory computer program product comprising instructions which, when the program is executed by a processor of a computer, cause the computer to perform the method of claim 1.

* * * * *